(12) United States Patent
Haynes

(10) Patent No.: US 9,109,515 B2
(45) Date of Patent: Aug. 18, 2015

(54) GAS SEAL FOR AEROSPACE ENGINES AND THE LIKE

(71) Applicant: Kaydon Ring & Seal, Inc., Baltimore, MD (US)

(72) Inventor: George P. Haynes, Baltimore, MD (US)

(73) Assignee: Kaydon Ring & Seal, Inc., Baltimore, MD (US)

( * ) Notice: Subject to any disclaimer, the term of this patent is extended or adjusted under 35 U.S.C. 154(b) by 231 days.

(21) Appl. No.: 13/721,565

(22) Filed: Dec. 20, 2012

(65) Prior Publication Data

US 2014/0062028 A1 Mar. 6, 2014

Related U.S. Application Data

(62) Division of application No. 13/442,927, filed on Apr. 10, 2012, now Pat. No. 8,439,365, which is a division of application No. 12/685,851, filed on Jan. 12, 2010, now Pat. No. 8,181,966.

(60) Provisional application No. 61/143,984, filed on Jan. 12, 2009.

(51) Int. Cl.
*F02C 7/28* (2006.01)
*F16J 15/34* (2006.01)
*F16J 15/44* (2006.01)

(52) U.S. Cl.
CPC ............... *F02C 7/28* (2013.01); *F16J 15/342* (2013.01); *F16J 15/3452* (2013.01); *F16J 15/3464* (2013.01); *F16J 15/3472* (2013.01); *F16J 15/441* (2013.01); *F16J 15/346* (2013.01)

(58) Field of Classification Search
CPC ... F16J 15/3404; F16J 15/342; F16J 15/3436; F16J 15/83448; F16J 15/3452; F16J 15/346; F16J 15/3464; F16J 15/3472; F16J 15/441; F02C 7/28
USPC .................. 277/371, 372, 373, 387, 408, 431
See application file for complete search history.

(56) References Cited

U.S. PATENT DOCUMENTS

| | | |
|---|---|---|
| 2,571,035 A | 10/1951 | Hastings |
| 2,834,619 A | 5/1958 | McNab |
| 2,985,472 A | 5/1961 | Schoenrock |
| 3,117,793 A | 1/1964 | Hauser et al. |
| 3,612,548 A | 10/1971 | Tracy |
| 3,784,213 A | 1/1974 | Voitik |
| 4,114,900 A | 9/1978 | Wiese |
| 4,212,475 A | 7/1980 | Sedy |
| 4,213,618 A | 7/1980 | Thurber |
| 4,451,049 A | 5/1984 | Charhut |

(Continued)

*Primary Examiner* — Kristina Fulton
*Assistant Examiner* — Nicholas L Foster
(74) *Attorney, Agent, or Firm* — Price Heneveld LLP

(57) ABSTRACT

A gas seal for aerospace engines has a stationary seal housing, a rotating seal plate mounted on the engine drive shaft and a carbon ring seal movably supported in the housing with a face which mates with the face of the seal plate to create a gas seal therebetween. A plurality of flexible pins have first ends supported on the housing and second ends slidably connected with the carbon ring seal to permit the latter to shift axially. A plurality of compression springs bias the two seal faces together. The housing has a first twist lock which selectively engages a second twist lock on the carbon ring seal to movably retain the latter in the housing. The second ends of the spring pins resiliently deflect during mutual rotation of the carbon ring seal and the housing to facilitate engagement and disengagement of the first and second twist locks.

18 Claims, 11 Drawing Sheets

(56) References Cited

U.S. PATENT DOCUMENTS

| | | |
|---|---|---|
| 4,453,722 A | 6/1984 | Swanson |
| 4,477,088 A | 10/1984 | Picard |
| 4,552,368 A | 11/1985 | Wallace |
| 4,746,268 A * | 5/1988 | Sugimoto et al. ............. 415/231 |
| 5,026,076 A | 6/1991 | Back |
| 5,188,377 A | 2/1993 | Drumm |
| 5,421,593 A | 6/1995 | Aritsubo et al. |
| 5,451,065 A | 9/1995 | Holder |
| 5,813,674 A | 9/1998 | Dickie et al. |
| 6,076,830 A | 6/2000 | Wu et al. |
| 6,176,330 B1 * | 1/2001 | Burr ............................. 175/371 |
| 6,293,555 B1 | 9/2001 | Sedy |
| 6,325,378 B1 | 12/2001 | Okumachi et al. |
| 6,425,583 B1 | 7/2002 | Muraki |
| 6,427,790 B1 * | 8/2002 | Burr ............................. 175/371 |
| 6,431,553 B1 | 8/2002 | Amaral et al. |
| 6,568,686 B2 | 5/2003 | Hadley |
| 6,692,006 B2 | 2/2004 | Holder |
| 6,932,348 B2 | 8/2005 | Takahashi |
| 2002/0096834 A1 | 7/2002 | Hadley |
| 2007/0216107 A1 | 9/2007 | Freling |
| 2007/0296156 A1 | 12/2007 | Yanagisawa et al. |
| 2009/0152818 A1 * | 6/2009 | Droscher et al. ............. 277/370 |

* cited by examiner

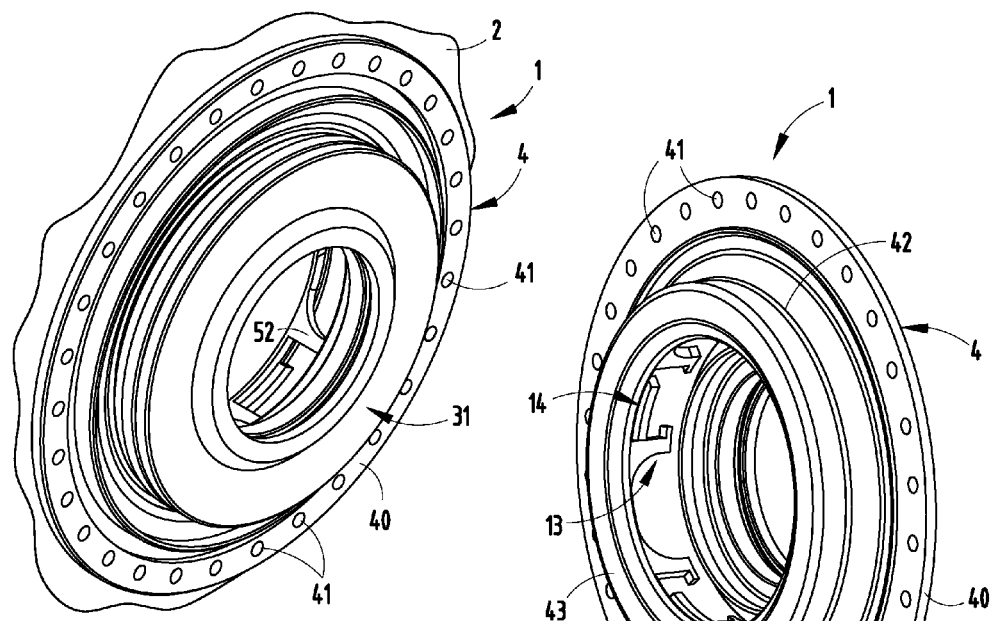
FIG. 1
FIG. 2
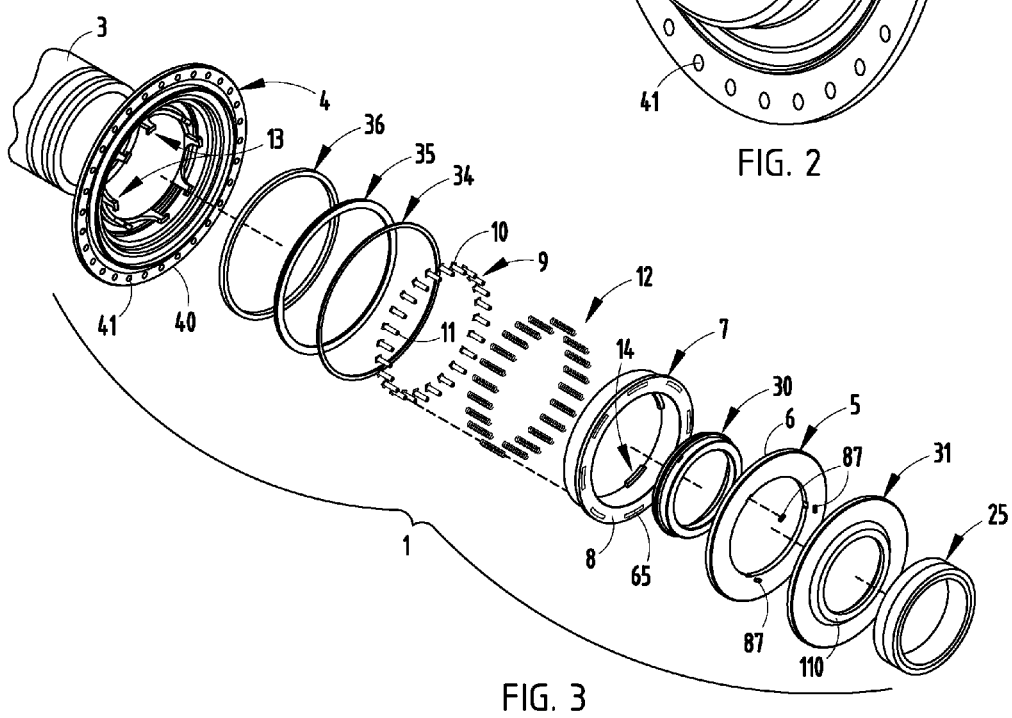
FIG. 3

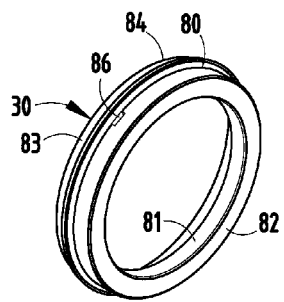
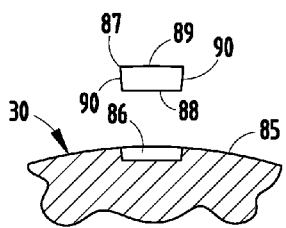
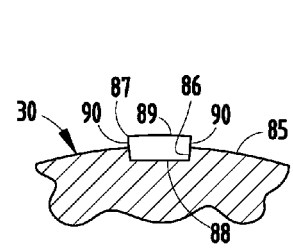
FIG. 20  FIG. 21
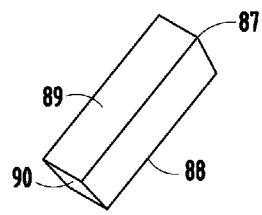
FIG. 22
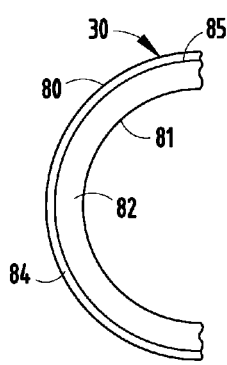
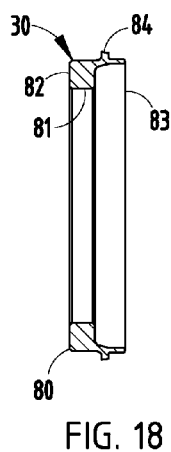
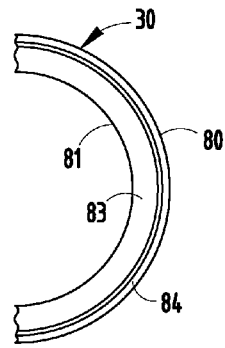
FIG. 16
FIG. 17  FIG. 18  FIG. 19

GAS SEAL FOR AEROSPACE ENGINES AND THE LIKE

CLAIM OF PRIORITY

Applicants hereby claim the priority benefits under the provisions of 35 U.S.C. §120 to related Provisional Patent Application Ser. No. 61/143,984, filed Jan. 12, 2009 on AEROSPACE LIFT OFF SEAL.

BACKGROUND OF THE INVENTION

The present invention relates to gas seals, and in particular to a gas seal for aerospace engines and other similar applications.

Gas seals are generally well known in the art, and are used in conjunction with a wide variety of turbo machinery, such as jet engines, turbines, compressors and the like, to form a non-liquid or gas seal between two portions of an associated turbo machine Examples of such gas seals are disclosed in U.S. Pat. Nos. 3,640,541; 5,066,026; 5,174,584 and 6,142,728. In general, such gas seals include a rotating metal seal plate that is attached to an associated rotating drive shaft, which incorporates an annular face that seals against the annular face of an associated stationary face seal or ring that is typically made of carbon or the like and mounted in an associated stationary housing. A biasing mechanism, such as springs or the like, is typically provided to urge adjacent faces of the carbon ring seal and the seal plate together. Furthermore, in non-contacting or lift off gas seals, the interior or sealing face of the carbon ring seal is typically provided with a series of very small grooves which form gas ramps that hydrodynamically create a thin gas film between the adjacent faces of the carbon ring seal and the seal plate, such that the same lift off of one another and do not actually come into contact when the gas seal is in full operation.

Gas seals for aerospace engines must be extremely lightweight, compact, capable of withstanding very high pressures and temperatures, and very durable even at extremely high speeds in excess of 26,000 rpm. A gas seal which can meet the exacting dimensional, weight, stress and thermal demands experienced in high speed aircraft gas turbine engines would be clearly advantageous.

SUMMARY OF THE INVENTION

One aspect of the present invention is a gas seal for aerospace engines and the like of the type having an engine housing with an engine drive shaft rotatably mounted therein. A stationary seal housing is configured for rigid connection with the engine housing. A rotating seal plate is configured for operable connection with the engine drive shaft, rotates therewith relative to the seal housing and has a seal face. A carbon ring seal is supported in the seal housing and includes a seal face which mates with the seal face of the seal plate to create a gas seal between the engine housing and the engine drive shaft. A plurality of flexible spring pins have first ends thereof supported on the seal housing and second ends thereof slidingly connected with the carbon ring seal to permit the carbon ring seal to selectively shift axially in the seal housing toward and away from the seal plate. A plurality of compression springs are supported on the flexible spring pins and bias the seal face of the carbon ring seal axially into a sealing relationship with the seal face of the seal plate. A first twist lock member is associated with the seal housing, and a second twist lock member is associated with the carbon ring seal and is configured to mate with the first twist lock member associated with the seal housing to securely yet detachably retain the carbon ring seal in the seal housing. The second ends of the flexible spring pins are laterally flexible relative to the first ends of the flexible spring pins, and can resiliently deflect in a generally circular fashion during mutual rotation of the seal housing and the carbon ring seal to facilitate engagement and disengagement of the first and second twist lock members.

Another aspect of the present invention is a gas seal for aerospace engines and the like of the type having an engine housing with an engine drive shaft rotatably mounted therein. A stationary seal housing is configured for rigid connection with the engine housing. A rotating seal plate is configured for operable connection with the engine drive shaft, rotates therewith relative to the seal housing and has a seal face. A carbon ring seal is moveably supported in the seal housing and includes a seal face which mates with the seal face of the seal plate to create a gas seal between the engine housing and the engine drive shaft. A plurality of pins have first ends thereof supported on the seal housing and second ends thereof slidingly connected with the carbon ring seal to permit the carbon ring seal to selectively shift axially in the seal housing toward and away from the seal plate. A plurality of compression springs bias the seal face of the carbon ring seal axially into a sealing relationship with the seal face of the seal plate. The seal housing has an outer side adapted for communication with a relative high pressure portion of the engine housing, and an inner side adapted for communication with a relatively low pressure portion of the engine housing. A first passageway is positioned in the seal housing, such that radially interior portions of the seal faces of the seal plate and the carbon ring seal communicate with the high pressure portion of the engine housing, and radially exterior portions of the seal faces of the seal plate and the carbon ring seal communicate with the lower pressure portion of the engine housing. A second passageway in the seal housing communicates the high pressure portion of the engine housing with an exterior face of the carbon ring seal to urge the seal face of the carbon ring seal toward the seal face of the seal plate. The seal faces of seal plate and the carbon ring seal are configured to create a dynamic gas film therebetween during operation from the controlled flow of gas from the high pressure portion of the engine housing to the low pressure portion of the engine housing. A locking plate is configured for operable connection with the engine drive shaft and rotates therewith along with the seal plate relative to the seal housing. The locking plate movably supports the seal plate to permit the seal plate to shift axially toward and away from the carbon ring seal. A pressure balance plate is configured for operable connection with the engine drive shaft and rotates therewith along with the seal plate relative to the seal housing. The pressure balance plate includes an annular groove disposed along an inside face of the seal plate which communicates with the high pressure portion of the engine compartment to urge the seal face of the seal plate toward the seal face of the carbon ring seal.

Yet another aspect of the present invention is a gas seal for aerospace engines and the like of the type having an engine housing with an engine drive shaft rotatably mounted therein. A stationary seal housing is configured for rigid connection with the engine housing. A rotating seal plate is configured for operable connection with the engine drive shaft, rotates therewith relative to the seal housing and has a seal face. A carbon ring seal is moveably supported in the seal housing and includes a seal face which mates with the seal face of the seal plate to create a gas seal between the engine housing and the engine drive shaft. A plurality of pins have first ends thereof supported on the seal housing and second ends thereof slidingly connected with the carbon ring seal to permit the carbon ring seal to selectively shift axially in the seal housing toward and away from the seal plate. A plurality of compression springs bias the seal face of carbon ring seal axially into a sealing relationship with the seal face of the seal plate. The carbon ring seal has an annularly-shaped exterior face disposed generally opposite the seal face of the carbon ring seal, and includes a plurality of axially extending circumferentially spaced apart apertures receiving therein the second ends of the pins to facilitate sliding axial alignment between the carbon ring seal and the seal housing and to reduce the mass of the carbon ring seal for improved dynamic alignment between the seal faces of the carbon ring seal and the seal plate.

Yet another aspect of the present invention is a gas seal for aerospace engines and the like, which includes a low friction secondary seal for improved seal integrity, without excess wear.

Yet another aspect of the present invention is a non-contact, lift off type gas seal which meets the exacting dimensional, weight, stress and thermal demands experienced in high speed aircraft gas turbine engines and similar turbo machinery.

Yet another aspect of the present invention is a gas seal for aerospace engines and the like, which has an uncomplicated design, is efficient in use, economical to manufacture, capable of a long operating life, and particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 1 is perspective view of a gas seal embodying the present invention, taken from a front or interior side thereof.

FIG. 2 is a perspective view of the gas seal, taken from a back or exterior side thereof.

FIG. 3 is an exploded perspective view of the gas seal, shown with an associated engine drive shaft and engine bearing.

FIG. 16 is a perspective view of a locking plate portion of the gas seal.

FIG. 17 is a fragmentary front elevational view of the locking plate.

FIG. 18 is a cross-sectional view of the locking plate.

FIG. 19 is a fragmentary rear elevational view of the locking plate.

FIG. 20 is an enlarged fragmentary cross-sectional view of a marginal portion of the locking plate with a keyway and associated key shown in a disassembled condition.

FIG. 21 is an enlarged fragmentary view of the marginal portion of the locking plate with the key shown assembled in the keyway.

FIG. 22 is a perspective view of the key shown in FIGS. 20 and 21.

DETAILED DESCRIPTION OF THE PREFERRED EMBODIMENTS

Figure 4:
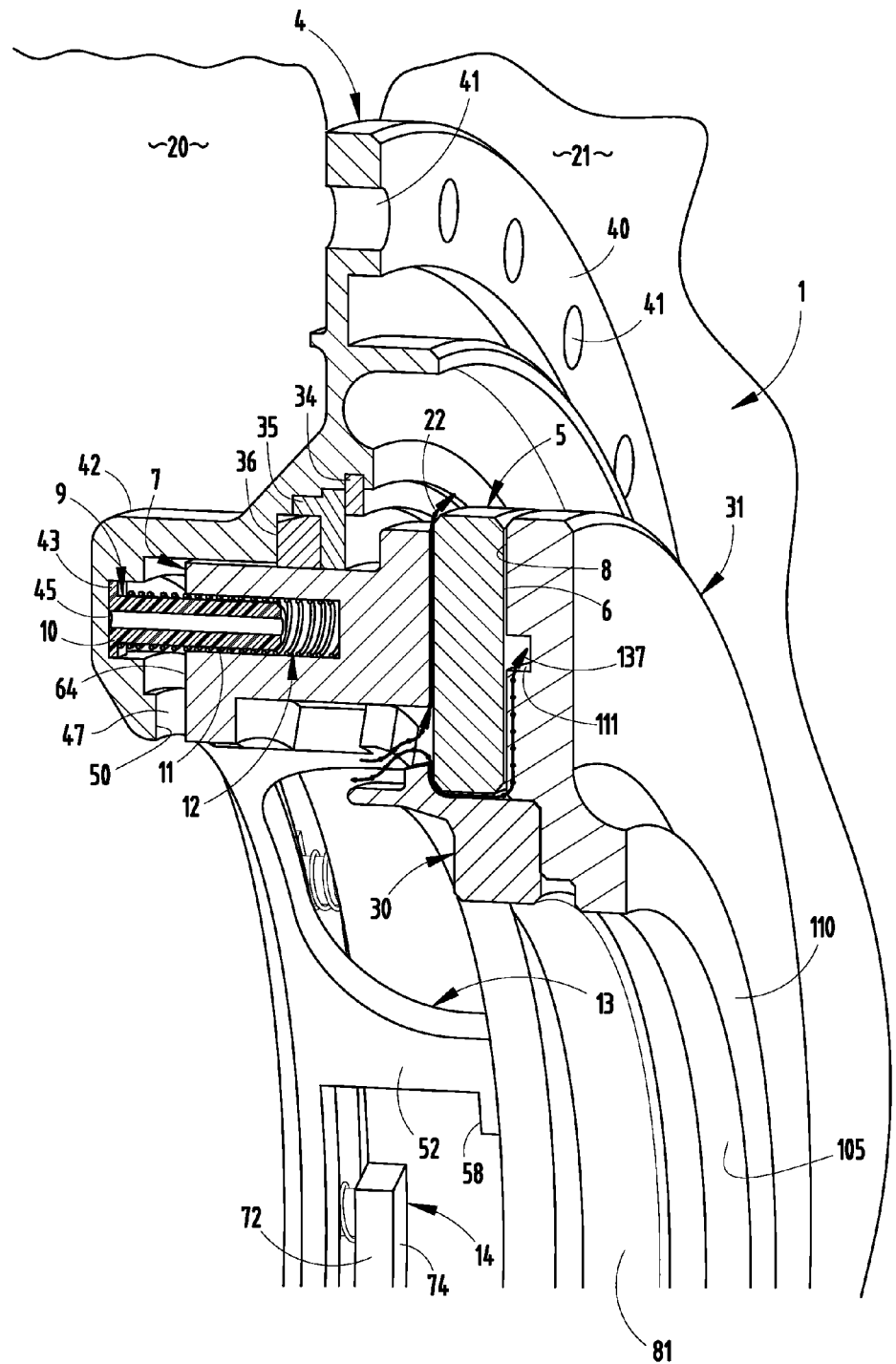
FIG. 4 is an enlarged fragmentary perspective view of the gas seal.

For purposes of description herein, the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIGS. 1-3) generally designates a gas seal embodying the present invention, which is particularly adapted for use in conjunction with aerospace engines and the like of the type having an engine housing 2 with an engine drive shaft 3 rotatably mounted therein. Gas seal 1 has a stationary seal housing 4 configured for rigid connection with engine housing 2. A rotating seal plate 5 is configured for operable connection with the engine drive shaft 3, rotates therewith relative to seal housing 4 and has a seal face 6. A carbon ring seal 7 is movably supported in seal housing 4 and includes a seal face 8 which mates with the seal face 6 of seal plate 5 to create a gas seal between the engine housing 2 and the engine drive shaft 3. A plurality of flexible spring pins 9 have first ends 10 supported on seal housing 4 and second ends 11 slidingly connected with carbon ring seal 7 to permit the carbon ring seal to selectively shift axially in seal housing 4 toward and away from seal plate 5. A plurality of compression springs 12 are supported on flexible spring pins 9 and bias the seal face 8 of carbon ring seal 7 axially into a sealing relationship with the seal face 6 of seal plate 5. A first twist lock member 13 is associated with seal housing 4 and a second twist lock member 14 is associated with carbon ring seal 7 and is configured to mate with the first twist lock member 13 associated with seal housing 4 to securely yet detachably retain carbon ring seal 7 in seal housing 4. The second ends 11 of flexible spring pins 9 are laterally flexible relative to the first ends 10 of flexible spring pins 9 and can resiliently deflect in a generally circular fashion during mutual rotation of seal housing 4 and carbon ring seal 7 to facilitate engagement and disengagement of the first and second twist lock members 13, 14.

Gas seal 1 is particularly adapted for use in conjunction with aerospace engines and the like, and as best illustrated in FIG. 4, serves to form a rotating seal between a relatively high pressure, high temperature portion of the engine, which is identified by the reference numeral 20 on the left-hand side of FIG. 4, and a relatively low pressure, low temperature portion of the engine, which is identified by the reference numeral 21 on the right-hand side of FIG. 4. Typically, the relatively low pressure, low temperature portion 21 of the engine comprises a bearing and oil compartment of the aerospace engine. Pressure is generated by a compressor in the front of the engine and a combustor in rear of the engine, which generate the turbine's mode of force, and constitute the high pressure, high temperature area 20 of the engine. Relative low pressure, low temperature air contained in the bearing compartment or low pressure area 21 of the engine preferably contains a fine oil mist, which is used to lubricate the various bearing portions of the aerospace engine, including the gas seal 1. Gas seal 1 is a non-contact or lift off type of gas seal, wherein a very small amount of the relatively high pressure, high temperature air in engine compartment 2 migrates at a controlled rate into the bearing and oil compartment 21 of the engine by passing radially outwardly between the seal face 6 of seal plate 5 and the seal face 8 of carbon ring seal 7, as shown by the arrows 22 in FIGS. 4 and 47.

For purposes of description herein, that side of gas seal 1 facing the high pressure area 20 of the engine is referred to as the back, exterior and/or outer side, and that side of gas seal 1 facing the low pressure area 21 of the engine is referred to as the front, inner and/or interior side.

In the example illustrated in FIG. 3, engine drive shaft 3 is at least partially supported by a bearing 25 located within the low pressure area or compartment 21 of the engine, and gas seal 1 forms a rotating seal between the high pressure area 20 of the engine and the low pressure area 21 of the engine in which bearing 25 is disposed. With reference to FIG. 3, the illustrated gas seal 1 has three basic rotating elements or parts, comprising a locking plate 30, seal plate 5 and a pressure balance plate 31. Locking plate 30 is mounted on engine drive shaft 3 and rotates therewith. Seal plate 5 is mounted on locking plate 30 and also rotates with locking plate 30 and engine drive shaft 3. Pressure balance plate 31 is also mounted on engine drive shaft 3 and rotates therewith at a location axially adjacent to seal plate 5 for purposes to be described in greater detail hereinafter. The illustrated gas seal 1 has six basic non-rotating elements or parts, comprising carbon ring seal 7, a retainer ring 34, a cover plate 35, a secondary seal 36, compression springs 12, spring pins 9 and seal housing 4. Spring pins 9 and compression springs 12, in conjunction with the pressure generated in the gas path, as described in greater detail below, resiliently urge carbon ring seal 7 axially toward seal plate 5 to ensure proper contact between seal faces 6 and 8.

Figures 5, 9:
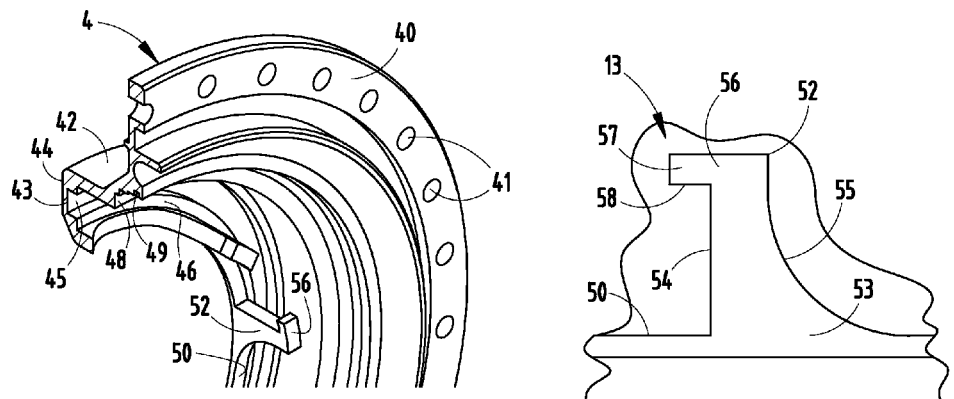
FIG. 5 is a fragmentary perspective view of a stationary seal housing portion of the gas seal.
FIG. 9 is an enlarged plan view of a bayonet lock portion of the stationary seal housing.
Figures 6, 7, 8:
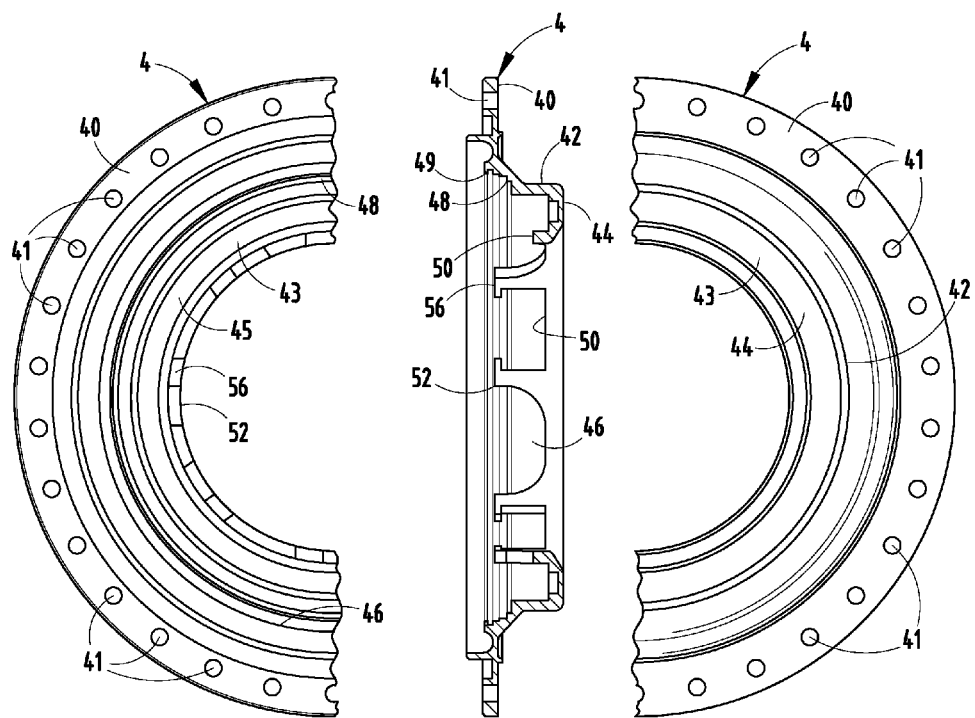
FIG. 6 is a fragmentary front elevational view of the stationary seal housing.
FIG. 7 is a cross-sectional view of the stationary seal housing.
FIG. 8 is a fragmentary rear elevational view of the stationary seal housing.
Figure 10:
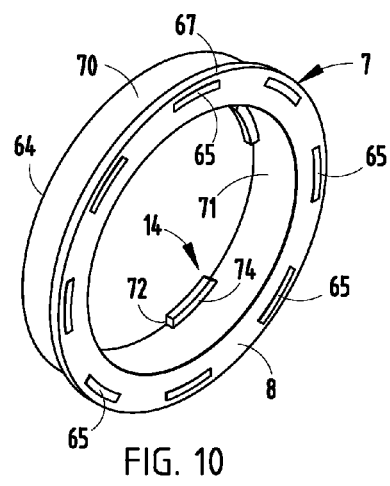
FIG. 10 is a perspective view of a carbon ring seal portion of the gas seal.
Figure 14:
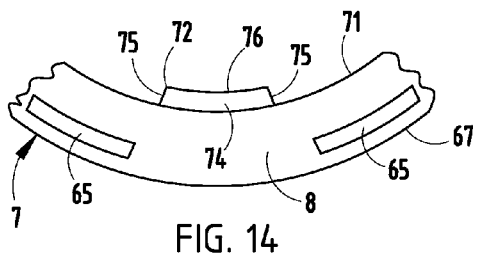
FIG. 14 is an enlarged elevational view of a bayonet lock portion of the carbon ring seal.
Figure 15:
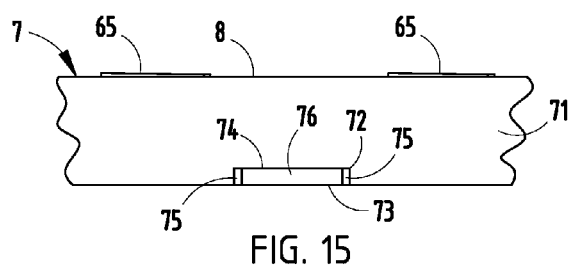
FIG. 15 is an enlarged plan view of the bayonet lock portion of the carbon ring seal.
Figure 11:
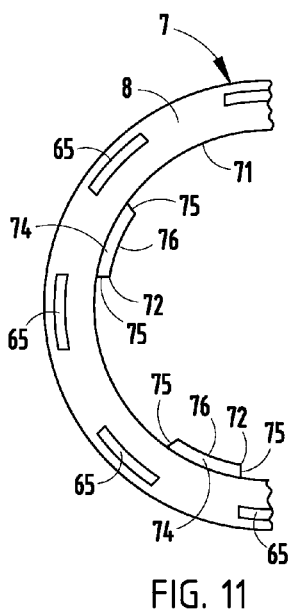
FIG. 11 is a fragmentary front elevational view of the carbon ring seal.
Figure 12:
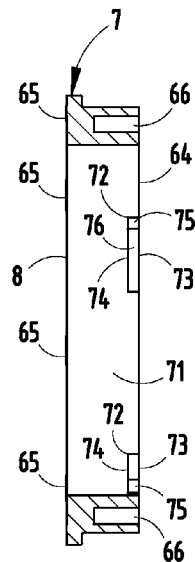
FIG. 12 is a cross-sectional view of the carbon ring seal.
Figure 13:
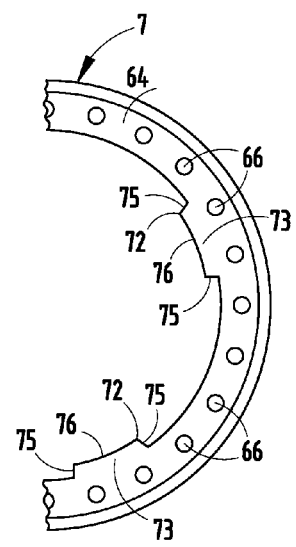
FIG. 13 is a fragmentary rear elevational view of the carbon ring seal.
Figure 23:
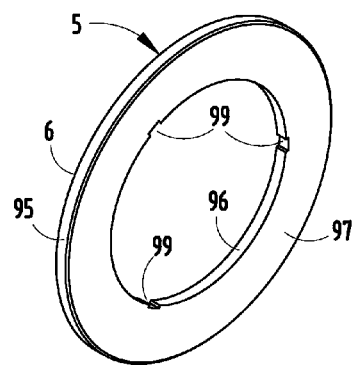
FIG. 23 is a perspective view of a rotating seal plate portion of the gas seal.
Figure 27:
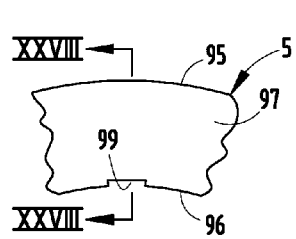
FIG. 27 is an enlarged fragmentary view of the seal plate showing a keyway portion thereof.
Figure 28:
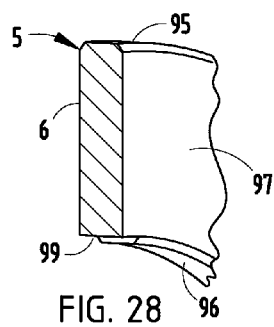
FIG. 28 is a perspective, cross-sectional view of the seal plate taken along the line XXVIII-XXVIII, FIG. 27 showing the keyway portion thereof.

With reference to FIGS. 5-9, the illustrated seal housing 4 has a rigid, one-piece construction with a generally annular shape, and includes a marginal mounting flange 40 with axially extending fastener apertures 41 for rigidly attaching gas seal 1 to stationary engine housing 2. Seal housing 4 also has a body portion 42 adapted to retain the non-rotating elements 7, 9, 12 and 34-36 of gas seal 1. More specifically, the body portion 42 of seal housing 4 includes an axially outwardly extending hub 43 having a rear wall 44 with a continuous circular slot 45 in the interior side thereof in which the outer ends 10 of spring pins 9 are received and selectively retained, as explained in greater detail below. Hub 43 also includes an inwardly opening pocket 46 in which carbon ring seal 7 is slidably retained for axial motion toward and away from seal plate 5. Hub 43 also defines a radially extending space or gas passageway 47 between inner edge 50 and the rearward face 64 of carbon ring seal 7, which communicates the high pressure, high temperature gas in engine compartment 20 with the rear or exterior side 64 of carbon ring seal 7, as noted by the arrow 136 in FIGS. 4 and 47. Hub 43 also includes an annularly-shaped axially oriented slot 48 in which secondary seal 36 is retained by cover plate 35, as well as a radially oriented retainer slot 49 in which retaining ring 34 is received to hold cover plate 35 and secondary seal 36 in place. Seal housing 4 also includes a plurality of axially inwardly extending bayonet fingers or prongs 52 which are disposed on the radially inward side of seal housing 4. As best illustrated in FIG. 9, each of the bayonet prongs 52 has a hook-shaped plan configuration, comprising a base portion 53, a straight edge portion 54, an arcuate edge portion 55 disposed opposite edge 54 and an L-shaped hook portion 56 having a circumferentially extending tooth 57 which defines a seal support ledge 58. In the illustrated example, seal housing 4 has eight substantially identical bayonet prongs 52, which are spaced generally equidistantly around the inner circumference of seal housing 4 and serve to detachably mount carbon ring seal 7 thereto in the manner described in greater detail hereinbelow.

With reference to FIGS. 10-15, the illustrated carbon ring seal 7 has a one-piece, monolithic construction, with a generally annular shape having seal face 8 disposed on the inner side thereof and an outer face 64 disposed opposite seal face 8. In the illustrated example, seal face 8 includes a plurality of circumferentially spaced apart ramps 65 which serve to create a thin, hydrodynamic gas film between the seal face 8 of carbon ring seal 7 and the seal face 6 of seal plate 5 when engine drive shaft 3 is rotating during engine operation. The outer face 64 of carbon ring seal 7 includes a plurality of axially extending, blind apertures 66 spaced equidistantly about a central area thereof, which are shaped to receive and retain therein spring pins 9, along with compression springs 12 mounted on spring pins 9. As discussed in greater detail below, blind apertures 66 serve to both retain spring pins 9 and compression springs 12 in proper axial alignment with carbon ring seal 7 and seal housing 4, and also reduce the mass of carbon ring seal 7 for improved dynamic alignment between seal faces 6 and 8. The exterior marginal surface of carbon ring seal 7 has a collar 67, with seal face 8 protruding radially outwardly to create a notch or shoulder area 69 with a cylindrical base surface 70 against which secondary seal 36 abuts. Preferably, base surface 70 has a low friction coating thereon which facilitates axial motion of carbon ring seal 7 relative to secondary seal 36, while maintaining a secure gas seal between the abutting surfaces. The inner marginal surface 71 of carbon ring seal 7 includes a plurality of radially inwardly protruding bayonet tabs 72, which are generally flush or planar with outer face 64, and selectively engage the bayonet prongs 52 on seal housing 4, as described in greater detail below. In the illustrated example, bayonet tabs 72 have a tapered or trapezoidal side elevational configuration, and include flat opposite side faces 73 and 74, angled side edges 75 and an arcuate marginal edge 76. The illustrated carbon ring seal 7 has a one-piece, integral construction made from carbon or graphite, such that it is relatively light-weight, and forms a flat compliant seal face 8 for sealing engagement with the more rigid seal face 6 of seal plate 5. As is well known in the art, various areas of carbon ring seal 7 wear during operation, including seal face 8, outer surface 70, tabs 72, etc., such that carbon ring seal 7 must be replaced on a regular basis to ensure proper operation.

With reference to FIGS. 16-22, the illustrated locking plate 30 has a rigid, one-piece construction with a generally annular shape, including cylindrically-shaped outer and inner marginal surfaces 80 and 81, as well as opposite side faces 82 and 83. The inner marginal surface 81 of locking plate 30 is shaped to be closely received over engine drive shaft 3 and rotatably attached thereto by a locknut or the like (not shown), such that locking plate 30 rotates with engine drive shaft 3. The outer marginal surface 80 of locking plate 30 includes a radially outwardly protruding rim 84 which defines a shoulder 85 adjacent side face 82 on which seal plate 5 is supported in the manner described in greater detail hereinbelow. As best illustrated in FIGS. 16, 20 and 21, shoulder 85 includes a plurality of radially inwardly extending keyways 86 spaced generally equidistantly about outer shoulder 85 in which associated keys 87 are received. In the illustrated example, keyways 86 have a substantially identical configuration, with a rectangular plan shape that that is elongated in the direction of the circumference of outer marginal surface 80. With reference to FIGS. 20-22, the illustrated keys 87 have a shape similar to that of keyways 86, comprising radially inner and outer edges 88 and 89, as well as opposite side edges 90. In the illustrated example, side edges 90 are generally tapered, and outer edge 89 has a slightly arcuate shape which protrudes radially outwardly from shoulder 85, as shown in FIG. 21.

Figure 29:
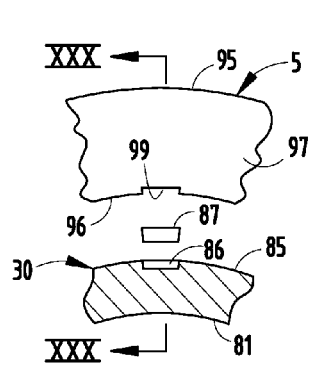
FIG. 29 is an enlarged fragmentary view of the seal plate, shown in a disassembled condition on the locking plate.
Figure 30:
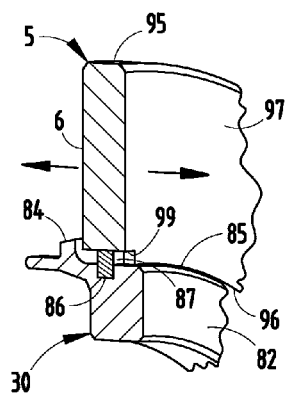
FIG. 30 is a perspective, cross-sectional view of the seal plate shown installed on the locking plate.
Figure 24:
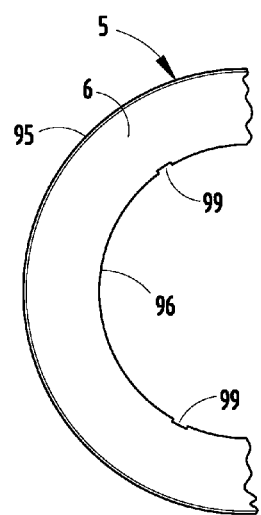
FIG. 24 is a fragmentary front elevational view of the seal plate.
Figure 25:
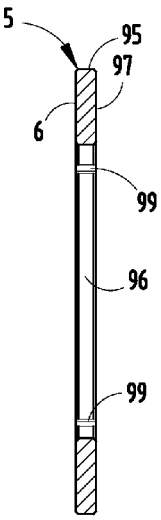
FIG. 25 is a cross-sectional view of the seal plate.
Figure 26:
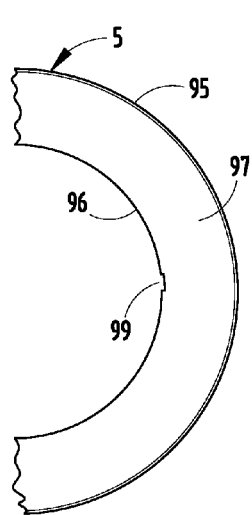
FIG. 26 is a fragmentary rear elevational view of the seal plate.
Figure 31:
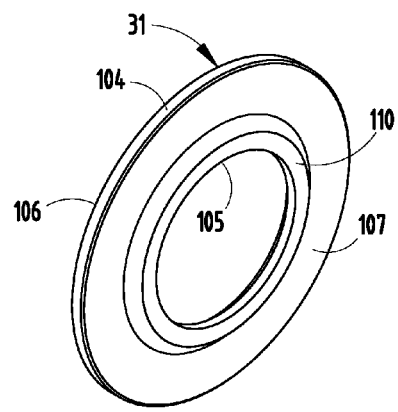
FIG. 31 is a perspective view of a pressure balance plate portion of the gas seal.

With reference to FIGS. 23-30, the illustrated seal plate 5 is an axially floating seal plate, and has a rigid, one-piece construction with a generally annular shape comprising a circular outer marginal edge or surface 95, a circular inner marginal edge or surface 96 and opposite side faces 6 and 97. The inner marginal edge 96 of seal plate 5 includes a plurality of circumferentially spaced apart keyways 99 which are oriented for radial alignment with the keyways 86 in locking plate 30 and are shaped to receive therein the radially outward portions of keys 87, as shown in FIGS. 29 and 30, so as to rotatably lock seal plate 5 onto locking plate 30, such that locking plate 30 and seal plate 5 rotate with engine drive shaft 3. In the illustrated example, keyways 99 are in the form of open sided, generally rectangular notches such that seal plate 5 can float or shift selectively in an axial direction toward and away from carbon ring seal 7, as shown in FIG. 30, and described in greater detail hereinafter. The rim 84 of locking plate 30 abuts the radially inward portion of the seal face 6 of seal plate 5 to positively limit the axially outwardly shifting movement of seal plate 5. The opposite faces 6 and 97 of seal plate 5 are substantially flat and mutually parallel. Preferably, seal plate 5 is constructed from metal, such as steel or the like.

Figure 35:
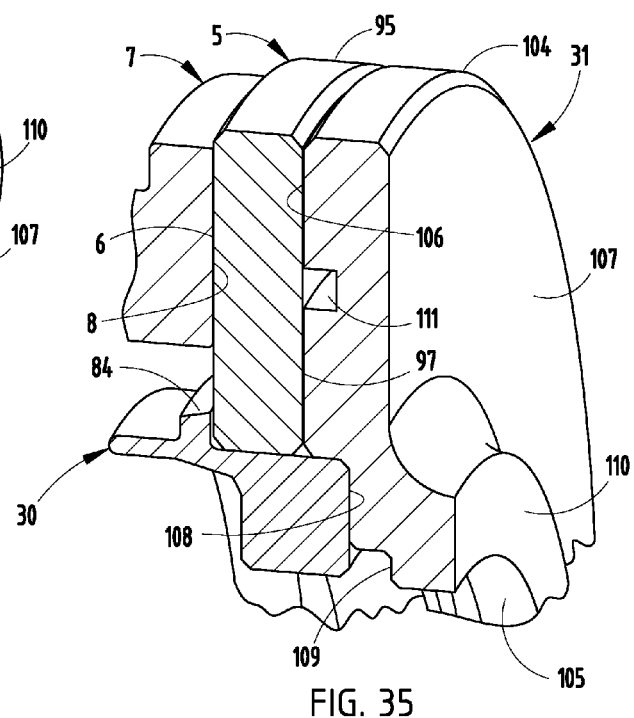
FIG. 35 is an enlarged fragmentary cross-sectional view of the gas seal, showing the locking plate, seal plate and pressure balance plate in an assembled condition.
Figure 32:
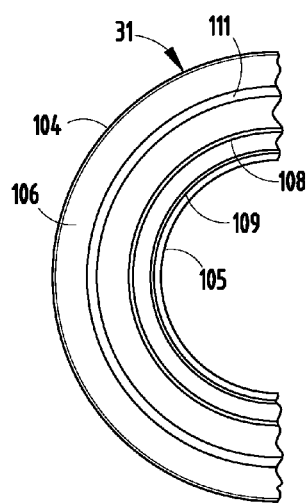
FIG. 32 is a fragmentary front elevational view of the pressure balance plate.
Figure 33:
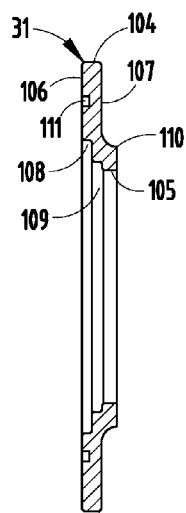
FIG. 33 is a cross-sectional view of the pressure balance plate.
Figure 34:
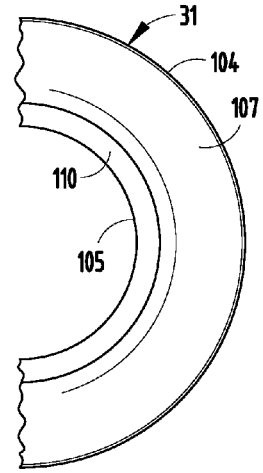
FIG. 34 is a fragmentary rear elevational view of the pressure balance plate.

With reference to FIGS. 31-35, the illustrated pressure balance plate 31 has a rigid, one-piece construction with a generally annular shape, comprising a circular outer marginal edge or surface 104, a circular inner marginal edge or surface 105 and opposite side faces 106 and 107. Side faces 106 and 107 are generally flat and mutually parallel. As best illustrated in FIGS. 32-34, side face 106 includes two annularly-shaped recesses 108 and 109 disposed concentrically relative to inner marginal edge 105, and side face 107 includes an outwardly protruding shoulder 110 disposed adjacent inner marginal edge 105. The outer side face 106 also includes an annularly-shaped groove 111 that forms part of a passageway through which pressurized air from engine compartment 2 is applied to the interior face 97 of floating seal plate 5 to resiliently urge floating seal plate 5 toward carbon ring seal 7 and balance the pressure applied to seal plate 5 by carbon ring seal 7. The inner marginal edge 105 of pressure balance plate 31 is adapted to be closely received over engine drive shaft 3 and rotatably connected thereto, such that pressure balance plate 31, locking plate 30 and floating seal plate 5 all rotate with engine drive shaft 3, but permit seal plate 5 to shift selectively axially toward and away from carbon ring seal 7. As best illustrated in FIG. 35, the innermost portion of the shoulder 85 on locking plate 30, along with locking ring face 82, are received in the annular recess 108 in pressure balance plate 31 and positively center the same in an axially aligned relationship.

With reference to FIGS. 36-42, the illustrated spring pins 9 have an integral or one-piece construction made from a high temperature polymer or the like, such that they are resiliently flexible in a lateral or side-to-side direction, like a leaf spring. Each of the spring pins 9 has a substantially identical construction, such that reference herein shall be made to the spring pin illustrated in FIG. 36, with it being understood that the remaining spring pins 9 are substantially identical. As best illustrated in FIGS. 36-39, the outer or first end 10 of spring pin 9 is in the form of an enlarged head having a circular end elevational shape. The body of spring pin 9 comprises a cylindrically-shaped shank 118 which has a central aperture 119 formed therethrough. The interior or second end 11 of spring pin 9 has a tapered configuration which facilitates insertion into an associated compression spring 12, as well as an associated one of the apertures 66 formed in the exterior face of carbon ring seal 7. The enlarged head end 10 of spring pin 9 is received and rides in the annular groove or slot 45 in seal housing 4, so as to retain the same in an axially extending orientation, but permit selected circumferential movement of spring pin 9 for purposes to be described in greater detail hereinafter.

Figure 36:
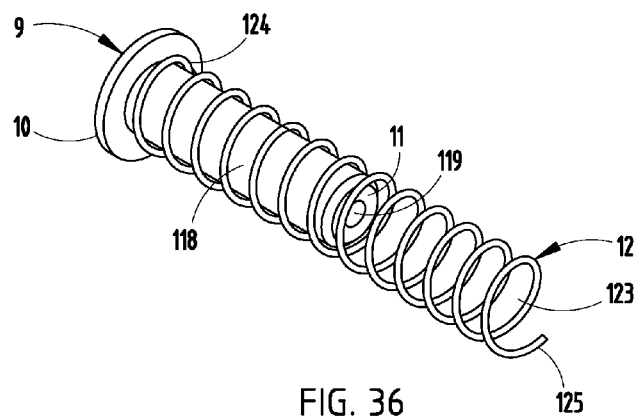
FIG. 36 is a perspective view of a flexible spring pin and a compression spring portion of the gas seal, shown in an assembled condition.
Figure 37:
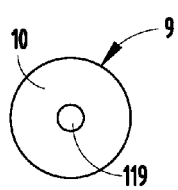
FIG. 37 is a rear end elevational view of the spring pin.
Figure 38:
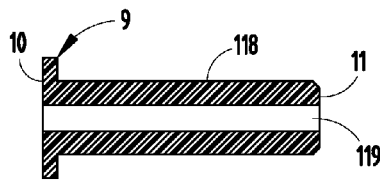
FIG. 38 is a cross-sectional view of the spring pin.
Figure 39:
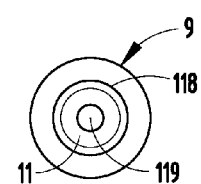
FIG. 39 is a front end view of the spring pin.
Figure 40:
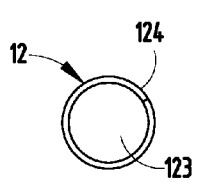
FIG. 40 is a rear end view of the compression spring.
Figure 41:
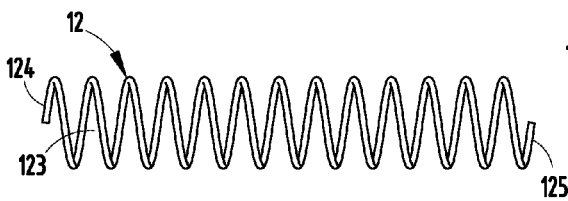
FIG. 41 is a side elevational view of the compression spring.
Figure 42:
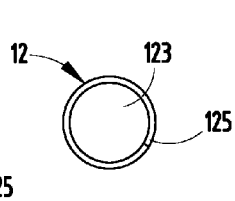
FIG. 42 is a front end view of the compression spring.

With reference to FIGS. 36 and 40-42, the illustrated compression springs 12 have a substantially identical construction, and each comprises a wound coil spring having an interior aperture 123 shaped to be closely received over the shank 118 of an associated spring pin 9. The outer end 124 of coil spring 12 abuts the enlarged head end 10 of spring pin 9, as shown in FIG. 36, while the inner end 125 of compression spring 12 is received within an associated aperture 66 in carbon ring seal 7 and abuts the interior end of the same. Consequently, coil springs 12 serve to bias carbon ring seal 7 axially outwardly toward seal plate 5.

Figure 45:
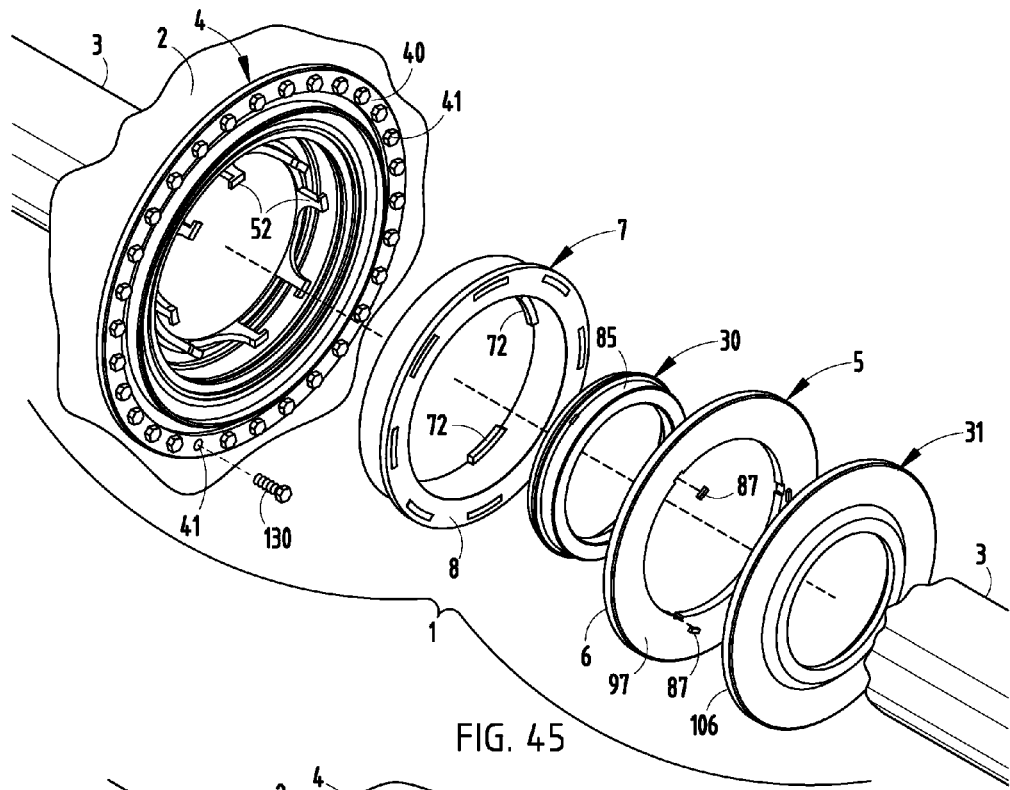
FIG. 45 is an exploded perspective view of the gas seal, showing the carbon ring seal prior to assembly in the seal housing.
Figure 46:
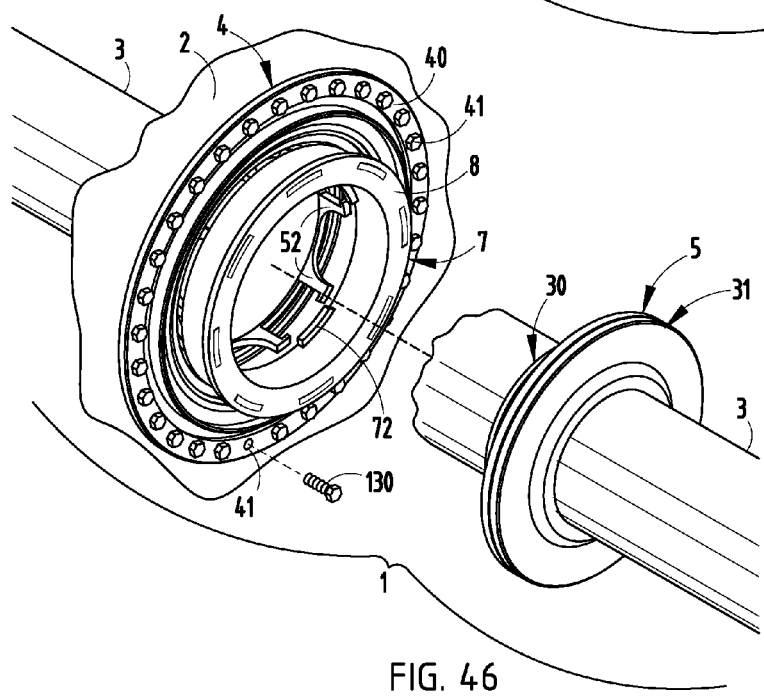
FIG. 46 is an exploded perspective view of the gas seal, showing the carbon ring seal being assembled into the seal housing.

With reference to FIGS. 45 and 46, the rotating elements 5, 30 and 31 of gas seal 1 are assembled in the following fashion. Locking plate 30 is inserted over the outer surface of engine drive shaft 3 and is received closely thereon. Seal plate 5 is then mounted on the shoulder 85 of locking plate 30, with keys 87 inserted into the opposite keyways 86 and 99, as shown in FIGS. 29 and 30, so as to rotatably couple engine drive shaft 3, seal plate 5 and locking plate 30, yet permit seal plate 5 to shift selectively axially on shoulder 85. Pressure balance plate 31 is then mounted on engine drive shaft 3 with the outer side face 106 abutting the inner face 97 of seal plate 5. Bearing 25 (FIG. 3) is mounted on engine drive shaft 3 and retained axially in place by a shaft shoulder and/or locking nut (not shown), so as to retain locking plate 30, seal plate 5 and pressure balance plate 31 in an axially formed stack which rotates with engine drive shaft 3. In one embodiment of the present invention, the rotating elements 5, 30 and 31 of gas seal 1 are held in place on the rotating engine drive shaft 3 by an axial compression load typically applied between a locknut (not shown) and the inner race of bearing 25.

Figure 44:
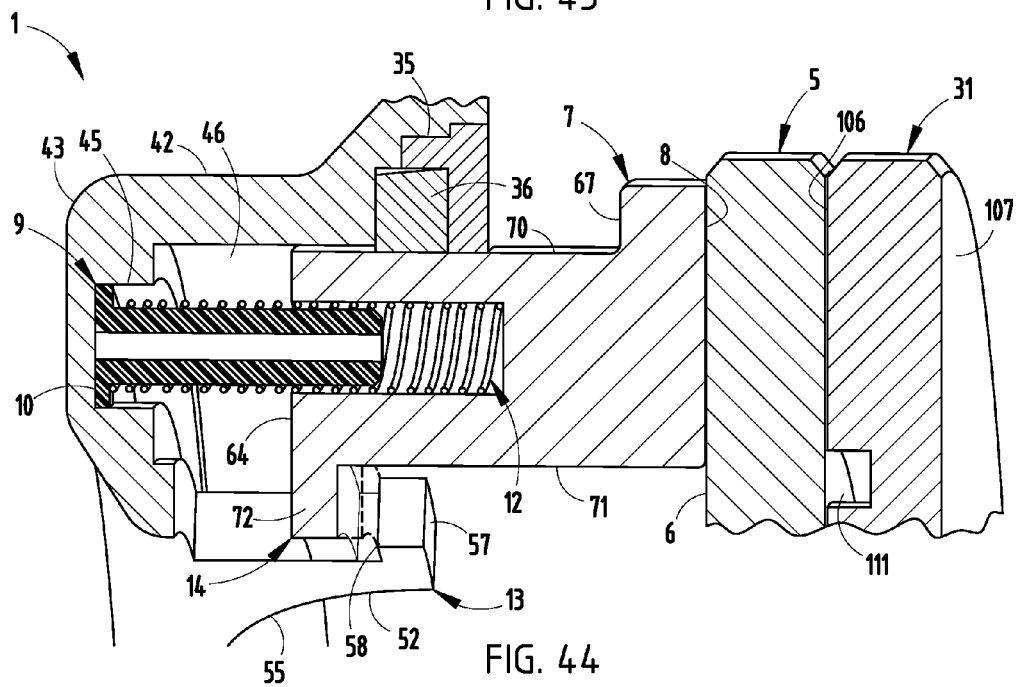
FIG. 44 is an enlarged fragmentary cross-sectional view of the spring pin and compression spring shown in an assembled operating condition.

The non-rotating or stationary elements 7, 9, 12 and 34-36 of gas seal 1 are assembled in the following fashion. Seal housing 4 is attached to the engine housing 2 using a plurality of threaded fasteners 130 (FIGS. 45 and 46) inserted through the apertures 41 in the marginal mounting flange 40 of seal housing 4. A plurality of compression springs 12 are mounted in the apertures 66 in the outer face 64 of carbon ring seal 7, and a plurality of spring pins 9 are inserted into the hollow interiors 123 of compression springs 12. Secondary seal 36 is then assembled over the exterior marginal surface 70 of carbon ring seal 7, along with cover plate 35. With spring pins 9 and compression springs 12 assembled in carbon ring seal 7, the outer face 64 of carbon ring seal 7 is inserted into the annular opening or pocket 46 in the hub portion 43 of seal housing 4. As discussed above, the enlarged head ends 10 of spring pins 9 are received and ride in the annular groove or slot 45 in the interior of seal housing 4 which radially locates spring pins 9 and compression springs 12, but permits the same to selectively shift circumferentially relative to seal housing 4. The bayonet tabs 72 on carbon ring seal 7 are positioned in between the bayonet prongs 52 on seal housing 4, as shown in FIG. 46, and carbon ring seal 7 is then shifted axially inwardly toward seal housing 4, thereby compressing compression springs 12, until such time as the inner sides or faces 74 of bayonet tabs 72 clear the interior ledges 58 of bayonet prongs 52. Carbon ring seal 7 is then rotated slightly in a clockwise or counterclockwise direction, depending upon the direction of rotation of engine drive shaft 3, until such time as the hook portions 56 of bayonet prongs 52 on seal housing 4 engage the side edges 75 of the bayonet tabs 72 on carbon ring seal 7. As best shown in FIG. 44, compression springs 12 bias the inner sides or faces 74 of bayonet tabs 72 securely against the interior ledges 58 of bayonet prongs 52 to axially position the same in an arcuate, but non-rigid relationship. Carbon ring seal 7 is thereby securely retained in place in seal housing 4 in a manner which permits carbon ring seal 7 to shift selectively axially toward and away from seal plate 5 during engine operation, and to be easily removed and replaced as necessary.

Figure 43:
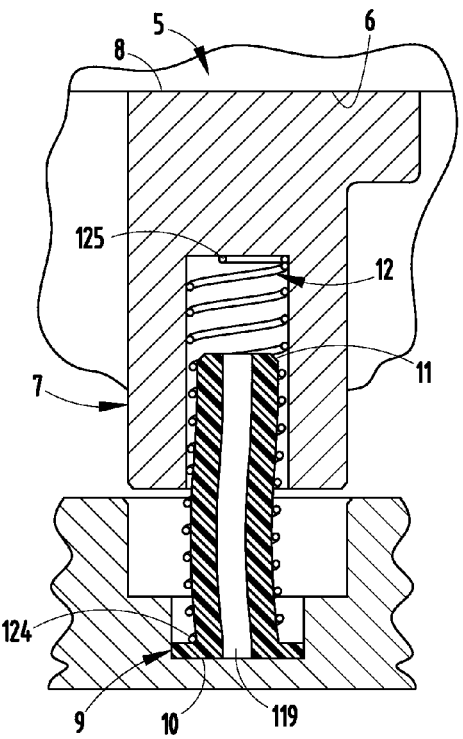
FIG. 43 is an enlarged fragmentary, partially schematic cross-sectional view of the spring pin and compression spring shown during assembly of the bayonet connection.

With reference to FIGS. 43 and 44, the configuration of spring pins 9 and compression springs 12 facilitates engagement and disengagement of the bayonet connectors 52 and 72 on seal housing 4 and carbon ring seal 7, and also serves to self-compensate for any wear in the contact portions of gas seal 1, as well as any slight misalignment that might occur between seal faces 6 and 8, particularly during high torque and high speed engine conditions. More specifically, the lateral flexibility of spring pins 9, which is shown in a somewhat exaggerated manner in FIG. 43, permits the inward ends 11 to shift resiliently in a circular fashion relative to the enlarged head ends 10, while maintaining the columnar or generally cylindrical shape of both spring pins 9 and compression springs 12. Also, the enlarge head ends 10 of spring pins 9 can shift in a circular pattern within the retaining slot or groove 45 in seal housing 4, which not only facilitates rotation of carbon ring seal 7 relative to seal housing 4 to engage and disengage bayonet connections 52 and 72, but also self-compensates as the anti-rotation features on carbon ring seal 7 wear. The bayonet tabs 72 on carbon ring seal 7 also wear from the constant circumferential torque and axial fretting motion between carbon ring seal 7 and seal housing bayonet prongs 52, as shown in FIG. 44. This wear will cause a normally small, but potentially significant rotation of carbon ring seal 7 relative to seal housing 4. Spring pins 9 provide axial spring alignment for both the assembly of bayonet connectors 52 and 72, and the compensation for wear on carbon ring seal 7, particularly tabs 72.

Figure 47:
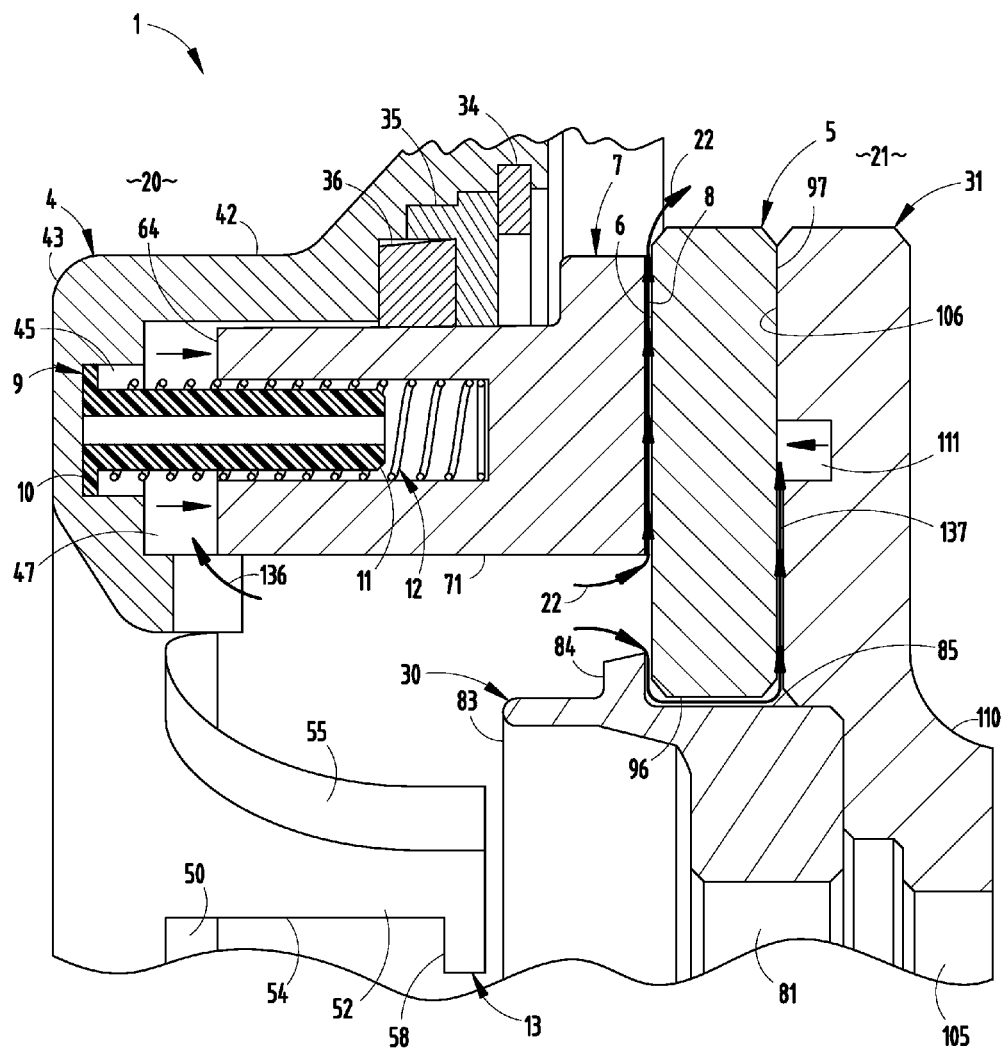
FIG. 47 is an enlarged fragmentary cross-sectional view of the gas seal, shown during operation.

When the aerospace engine is in operation, gas seal 1 functions in the following manner. With reference to FIGS. 4 and 47, a very small amount of the relatively high pressure, high temperature air in compartment or area 20 of the engine migrates at a controlled rate from compartment 20 to the bearing and oil compartment 21 of the engine by passing radially outwardly between the annularly-shaped faces 6, 8 of seal plate 5 and carbon ring seal 7, respectively, as shown by the arrows 22. The rotation of seal plate 5 relative to carbon ring seal 7 creates a hydrodynamic film which causes the seal faces 6 and 8 to lift off one another or separate slightly, so that they do not physically touch or abut during normal operation, so as to ensure a long operating life. The radially extending channel 47 formed between seal housing hub 43 and the outer face 64 of carbon ring seal 7 defines the air gap or passageway noted by the arrow 136 through which the relative high pressure, high temperature air in engine compartment 20 is communicated with the outer end face 64 of carbon ring seal 7, and thereby urges the seal face 8 of carbon ring seal 7 outwardly toward seal face 6 of floating seal plate 5. The low friction carbon secondary seal 36 mounted in seal housing 4 seals against the radially outermost surface 70 of carbon ring seal 7 to ensure that the relatively high pressure, high temperature air in the gas path compartment 20 does not flow unchecked into the engine bearing compartment 21.

A unique aspect of gas seal 1 is the construction of and dynamic interface between floating seal plate 5 and pressure balance plate 31. More specifically, in conventional gas seals, the rotating seal plate is typically fixedly clamped in an axial stack on an associated shaft, and the carbon ring is urged resiliently axially into abutment with the rotating seal plate by springs or the like. This direct clamping in the stack can experience distortion from high stack loads. In the present aerospace engine environment, the high pressure gases in engine compartment 20 act on carbon ring seal 7, and create substantial forces, which urge the same axially outwardly with sufficient force against seal plate 5 that they can also tend to distort the flat shape of the seal plate face 6 and/or the carbon ring seal face 8, thereby adversely impacting the integrity of the seal. In the present gas seal 1, seal plate 5 is permitted to shift or float axially relative to locking plate 30 and pressure balance plate 31, so as to avoid these sources of distortion. Also, the adjacent surfaces 106 and 97, and 96 and 85 of pressure balance plate 31, floating seal plate 5 and locking plate 30 are configured to create a passageway along the radially inward edge of floating seal plate 5 for the high pressure, high temperature gases in engine compartment 20 to pass to the groove 111 in pressure balance plate 31, as shown by the arrows 137 in FIGS. 4 and 47. As discussed above, this gas pressure serves to urge floating seal plate 5 axially outwardly toward carbon ring seal 7, and counterbalances the axial inward forces created by the high pressure gases in engine compartment 20 acting on the seal face 6 of seal plate 5 through carbon ring seal 7. The axially floating nature of seal plate 5 along with the counterbalancing pressure applied by pressure balance plate 31 ensure that seal plate 5 will not warp or distort even when the pressures in engine compartment 20 are very high.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A gas seal for aerospace engines and the like of the type having an engine housing with an engine drive shaft rotatably mounted therein, comprising:
a stationary seal housing configured for rigid connection with the engine housing;
a rotating seal plate that is configured for operable connection with the engine drive shaft, and rotates therewith relative to said seal housing and has a seal face;
a carbon ring seal movably supported in said seal housing and including a seal face which mates with said seal face of said seal plate to create a gas seal between the engine housing and the engine drive shaft;
a plurality of pins having first ends thereof movably supported on said seal housing and second ends thereof slidingly connected with said carbon ring seal to permit said carbon ring seal to selectively shift axially in said seal housing toward and away from said seal plate and to permit rotational movement of said carbon ring seal relative to said stationary seal housing;
a plurality of compression springs biasing said seal face of said carbon ring seal axially into a sealing relationship with said seal face of said seal plate; and wherein
said carbon ring seal has an annularly-shaped exterior face disposed generally opposite said seal face of said carbon ring seal, and includes a plurality of axially extending circumferentially spaced apart apertures receiving therein said second ends of said pins to facilitate sliding axial alignment between said carbon ring seal and said seal housing, and to reduce the mass of said carbon ring seal for improved dynamic alignment between said seal faces of said carbon ring seal and said seal plate.

2. A gas seal as set forth in claim 1, wherein:
said compression springs comprise coil springs which are retained coaxially on said pins, and are received in said apertures in said exterior face of said carbon ring seal.

3. A gas seal as set forth in claim 2, including:
a first twist lock member associated with said seal housing:
a second twist lock member associated with said carbon ring seal and configured to mate with said first twist lock member associated with said seal housing to securely yet detachably retain said carbon ring seal in said seal housing; and wherein
said pins comprise flexible spring pins having first and second ends, and wherein said second ends of said flexible spring pins are laterally flexible relative to said first ends of said flexible spring pins and can resiliently deflect in a generally circular fashion during mutual rotation of said seal housing and said carbon ring seal to facilitate engagement and disengagement of said first and second twist lock members.

4. A gas seal as set forth in claim 1, wherein:
said pins have a generally columnar shape, and are constructed from a high temperature polymer to facilitate selected resilient lateral flexure.

5. A gas seal as set forth in claim 4, wherein:
said first and second twist lock members define a bayonet coupling wherein said carbon ring seal is axially converged and rotated relative to said seal housing into a locked position.

6. A gas seal as set forth in claim 5, wherein:
said seal housing includes an annularly-shaped groove in which said first ends of said spring pins are received and retained.

7. A gas seal as set forth in claim 6, wherein:
said spring pins have a generally cylindrical shape with enlarged heads at said first ends thereof against which the associated outer ends of said compression springs abut, and which are closely received in said groove in said seal housing to permit circumferential shifting therebetween to automatically compensate for wear in said carbon ring seal.

8. A gas seal as set forth in claim 1, including:
a first twist lock member associated with said seal housing:
a second twist lock member associated with said carbon ring seal and configured to mate with said first twist lock member associated with said seal housing to securely yet detachably retain said carbon ring seal in said seal housing; and wherein
said pins comprise flexible spring pins having first and second ends, and wherein said second ends of said flexible spring pins are laterally flexible relative to said first ends of said flexible spring pins and can resiliently deflect in a generally circular fashion during mutual rotation of said seal housing and said carbon ring seal to facilitate engagement and disengagement of said first and second twist lock members.

9. A gas seal as set forth in claim 1, wherein:
said compression pins have a generally columnar shape, and are constructed from a high temperature polymer to facilitate selected resilient lateral flexure.

10. A gas seal as set forth in claim 8, wherein:
said first and second twist lock members define a bayonet coupling wherein said carbon ring seal is axially converged and rotated relative to said seal housing into a locked position.

11. A gas seal as set forth in claim 1, wherein:
said seal housing includes an annularly-shaped groove in which said first ends of said pins are received and retained.

12. A gas seal as set forth in claim 11, wherein:
said pins have a generally cylindrical shape with enlarged heads at said first ends thereof against which the associated outer ends of said compression springs abut, and which are closely received in said groove in said seal housing to permit circumferential shifting therebetween to automatically compensate for wear in said carbon ring seal.

13. A gas seal for aerospace engines and the like of the type having an engine housing with an engine drive shaft rotatably mounted therein, comprising:
a carbon ring seal;
a stationary seal housing configured for rigid connection with the engine housing;
an axially floating seal plate configured for operable connection with the engine drive shaft and rotates therewith relative to said seal housing and floats in an axial direction toward and away from said carbon ring seal, the seal plate having a seal face;
wherein the carbon ring seal is movably supported in said seal housing and includes a seal face which mates with said seal face of said seal plate to create a gas seal between the engine housing and the engine drive shaft;
a plurality of pins having first ends thereof movably supported on said seal housing and second ends thereof slidingly connected with said carbon ring seal to permit said carbon ring seal to selectively shift axially in said seal housing toward and away from said seal plate and to permit rotational movement of said carbon ring seal relative to said stationary seal housing;
a plurality of compression springs biasing said seal face of said carbon ring seal axially into a sealing relationship with said seal face of said seal plate; and wherein
said carbon ring seal has an annularly-shaped exterior face disposed generally opposite said seal face of said carbon ring seal, and includes a plurality of axially extending circumferentially spaced apart apertures receiving therein said second ends of said pins to facilitate sliding axial alignment between said carbon ring seal and said seal housing, and to reduce the mass of said carbon ring seal for improved dynamic alignment between said seal faces of said carbon ring seal and said seal plate.

14. A gas seal as set forth in claim 13, wherein:
said compression springs comprise coil springs which are retained coaxially on said pins, and are received in said apertures in said exterior face of said carbon ring seal.

15. A gas seal as set forth in claim 13, wherein:
said pins have a generally columnar shape, and are constructed from a high temperature polymer to facilitate selected resilient lateral flexure.

16. An aerospace engine, comprising:
an engine housing;
an engine drive shaft rotatably mounted in the housing;
a high pressure area formed by a compressor and a combustor;
a low pressure area formed by a bearing compartment;
a gas seal configured to seal the high pressure area from the low pressure area, the gas seal comprising:
a stationary seal housing configured for rigid connection with the engine housing;
a rotating seal plate that is configured for operable connection with the engine drive shaft and rotates therewith relative to said seal housing and has a seal face;
a carbon ring seal movably supported in said seal housing and including a seal face which mates with said seal face of said seal plate to create a gas seal between the engine housing and the engine drive shaft;
a plurality of pins having first ends thereof movably supported on said seal housing and second ends thereof slidingly connected with said carbon ring seal to permit said carbon ring seal to selectively shift axially in said seal housing toward and away from said seal plate and to permit rotational movement of said carbon ring seal relative to said stationary seal housing;
a plurality of compression springs biasing said seal face of said carbon ring seal axially into a sealing relationship with said seal face of said seal plate; and wherein
said carbon ring seal has an annularly-shaped exterior face disposed generally opposite said seal face of said carbon ring seal, and includes a plurality of axially extending circumferentially spaced apart apertures receiving therein said second ends of said pins to facilitate sliding axial alignment between said carbon ring seal and said seal housing, and to reduce the mass of said carbon ring seal for improved dynamic alignment between said seal faces of said carbon ring seal and said seal plate.

17. The aerospace engine of claim 16, wherein:
the seal face includes a plurality of circumferentially spaced apart ramps that create a hydrodynamic gas film between the seal face of the carbon ring seal and the seal face of the seal plate.

18. An aerospace engine as set forth in claim 16, wherein:
said compression springs comprise coil springs which are retained coaxially on said pins, and are received in said apertures in said exterior face of said carbon ring seal.

\* \* \* \* \*